US010193637B2

(12) United States Patent
Drost et al.

(10) Patent No.: US 10,193,637 B2
(45) Date of Patent: Jan. 29, 2019

(54) METHOD AND SYSTEM OF NETWORK SWITCH OPTIMIZATION

(71) Applicant: U.S. Army Research Laboratory ATTN: RDRL-LOC-I, Adelphia, MD (US)

(72) Inventors: Robert J. Drost, Washington, DC (US); Michael Brodsky, Millburn, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 363 days.

(21) Appl. No.: 15/000,556

(22) Filed: Jan. 19, 2016

(65) Prior Publication Data

US 2017/0207858 A1     Jul. 20, 2017

(51) Int. Cl.
*H04B 10/70*     (2013.01)
(52) U.S. Cl.
CPC .................................. *H04B 10/70* (2013.01)
(58) Field of Classification Search
CPC ....................................................... H04B 10/70
USPC ................................................ 398/118–131
See application file for complete search history.

(56) References Cited

U.S. PATENT DOCUMENTS

| 5,798,580 A | 8/1998 | Morozov et al. |
| 6,292,597 B1 | 9/2001 | Lagali et al. |
| 6,456,620 B1 | 9/2002 | Wang et al. |
| 6,567,858 B1 | 5/2003 | Yang et al. |
| 7,747,023 B2 * | 6/2010 | Bussieres .............. H04L 9/0852 380/278 |
| 8,311,221 B2 * | 11/2012 | Brodsky ................ H04B 10/70 380/256 |

(Continued)

OTHER PUBLICATIONS

Herbauts et al; Demonstration of active user routing of entanglement in a multi-user network; Nov. 2013; OSA; pp. 29013-29024.*

(Continued)

*Primary Examiner* — Amritbir K Sandhu
(74) *Attorney, Agent, or Firm* — Lawrence E. Anderson; Eric Brett Compton

(57) ABSTRACT

A method for determining a network configuration for the delivery of entangled photons individually to a plurality of users, the network comprising a plurality of inputs, switches, and outputs operatively connected by optical fibers;
the plurality of switches being switchable between two states; the method comprising:
determining the minimum number of switches necessary to deliver entangled photon pairs from a predetermined number of sources to a predetermined number of users,
minimizing the loss experienced by an entangled photon passing through the switches by minimizing the number of switches that any one photon passes through by selecting only nondominated switch configurations;
determining the minimum number of equivalent network switch configurations and eliminating all but one of the equivalent network switch configurations; and
selecting an optimum network configuration by which the plurality of inputs and the plurality of outputs are operatively interconnected using a minimum number of switches in any one route.

20 Claims, 18 Drawing Sheets

Representative of unique class of (6,5,2) feasible networks ($d = d^* = 2$ and $m = m^* = 5$).

TABLE II – Equivalence Classes for Nondominated Networks

| m | Number of configurations | Representatives |
|---|---|---|
| 0 | 1 | {} |
| 1 | 1 | {(0,2)} |
| 2 | 3 | {(0,2),(0,1)}, {·,·,(0,4)}, {·,·,(1,4)} |
| 3 | 12 | {(0,2),(0,1),(0,3)}, {·,·,(0,4)}, {·,·,(2,3)}, {·,·,(2,4)} {·,·,(3,4)}, {·,(0,4),(0,1)}, {·,·,(0,2)}, {·,·,(0,5)} {·,·,(1,5)}, {·,·,(2,5)}, {·,(1,4),(0,1)}, {·,·,(3,5)} |
| 4 | 40 | |

Representatives for $m = 4$ are omitted for brevity. Also, "·" is used to indicate numbers repeated from the previous represenative listing. For example, the fifth and sixth class representatives for $m = 3$ are {(0,2),(0,1),(3,4)} and {(0,2),(0,4),(0,1)}, respectively when only {·,·,(3,4)} & {·,(0,4),(0,1)} appear.

(56) References Cited

U.S. PATENT DOCUMENTS

| | | | |
|---|---|---|---|
| 8,391,282 B1* | 3/2013 | Lu | H04L 1/22 370/248 |
| 8,457,316 B2 | 6/2013 | Brodsky et al. | |
| 8,837,735 B2 | 9/2014 | Brodsky et al. | |
| 8,861,735 B2 | 10/2014 | Brodsky et al. | |
| 9,491,120 B2* | 11/2016 | Mehrvar | H04L 49/25 |
| 2007/0047444 A1 | 3/2007 | Leroy et al. | |
| 2009/0180776 A1* | 7/2009 | Brodsky | H04J 14/02 398/51 |
| 2012/0063769 A1* | 3/2012 | Brodsky | H04B 10/70 398/25 |
| 2012/0235839 A1 | 9/2012 | Mazumdar et al. | |
| 2013/0028552 A1 | 1/2013 | DeSalvo et al. | |
| 2013/0282636 A1 | 10/2013 | Macready et al. | |
| 2014/0153926 A1* | 6/2014 | Mower | H04B 10/70 398/101 |
| 2016/0105439 A1 | 4/2016 | Hunt et al. | |
| 2016/0112192 A1 | 4/2016 | Earl | |
| 2016/0227300 A1 | 8/2016 | Lai et al. | |
| 2016/0381443 A1 | 12/2016 | Mehrvar et al. | |
| 2017/0064417 A1* | 3/2017 | Mehrvar | H04Q 11/0003 |
| 2017/0115514 A1 | 4/2017 | Rad | |
| 2017/0176688 A1 | 6/2017 | Mehrvar | |
| 2018/0152295 A1* | 5/2018 | Drost | H04L 9/0855 |

OTHER PUBLICATIONS

Ciurana et al; Entanglement distribution in Optical networks; Jun. 2015; IEEE.*

Hall, Matthew, "Ultrafast Switching of Photonic Entanglement," American Physical Society Physical Review Letters, PRL 106, 053901 (2011).

Huang, Yu-Ping, et al., "Quantum theory of all-optical switching in nonlinear Sagnac interferometers," New Journal of Physics, IOP Publishing Ltd and Deutsche Physikalische Gesellschaft, 14 (2012) 053038.

"Proposal for an efficient quantum key distribution system using entanglement" Computer and Information Technology, 2008. ICCIT 2008. 11th International Conference on (Conference date Dec. 24-27, 2008; published Mar. 21, 2009).

KabaciAski, Wojciech, "Nonblocking electronic and photonic switching fabrics," Springer Science+Business Media, Inc. pp. 22, 32, 33, 65-71, 162-166 (2005).

Offerman, D.C., et al. "On a Class of Rearrangeable Switching Networks Part I: Control Algorithm" The Bell System Texhnical Journal, 1579-1600 (Dec. 1, 1970).

I. Herbauts, B. Blauensteiner, A. Poppe, T. Jennewein, and H. Hubei, "Demonstration of active routing of entanglement in a multi-user network," Appl. Opt., vol. 21, pp. 29 013-29 024, Nov. 2013.

Photop 2X2 Opto-Mechanical Switch Specifications, 253 Fuxin East Road, Fuzhou, Fujian 350014 P.R. China, revision A, 2008.

Luo, M.. et al. Controlled Photon Switch Assisted by Coupled Quantum Dots. Sci. Rep. 5, 11169; dal: 10.1038/srep11169 (2015).

Bourouha, Mohamed A. "Advances in Optical Switching and Networking: Past, Present and Future," Proceedings IEEE SoutheastCon 2002.

Poppe, A., et al. "Entanglement Generation and Routing in Optical Networks," ECOC 2014, Cannes—France (2014).

Chang-Hua, Zhu, et al. "Block-free optical quantum Banyan network based on quantum state fusion and fission." Chinese Physics B 23.12 (2014): 120309.

J. I. Cirac, et al.,, "Quantum State Transfer and Entanglement Distribution among Distant Nodes in a Quantum Network," vol. 78, No. 16 Phy s i cal Rev i ew Letters Apr. 21, 1997.

Josef Gigimayr, "Optimization of planar all-optical mult 1-layer switching architectures," Part ofthe SPJE Conference on Novel Optical Systems Desin and Oøtimization II • San Diego. California • Jul. 1998 SPIE vol. 3430 • 0277-786X/98/.

Zhen Wang, et al. "Size consistency of tensor network methods for quantum many-body systems," Physical Review B 88, 121105(R) (2013.

Gu, Huaxi, et al. ODOR: A Microresonator-based High-performance Low-cost Router for Optical Networks-on-Chip, CODES+ ISSS'08, Oct. 19-24, 2008, Atlanta, Georgia, USA.

* cited by examiner

METHOD OF CONSTRUCTING AN N X N NETWORK USING MINIMUM NUMBER OF SWITCHES

Statement of problem: For N input and N output ports there are multiple switching configurations. Entangled photons are very sensitive to loss of entanglement. Objective is to be able to deliver a pair of the entangled photons to each of the N ports for any pairing of the ports using a minimum number of switches in any stream. Entangled photons sensitive to loss so that minimum number of switches decreases potential for loss of photon and/or entanglement. GOAL -Route the $N/2$ pairs of entangled photons to a set of $N$ Users ⎯ 11

I. Find equivalent switching configurations for single switch ⎯ 12

Admissible Network Configurations -Begin with a set of $N/2$ sources of random entangled photon pairs. The sources are labeled $\{1, 2, ..., N/2\}$, with the $kth$ source having two outputs labeled $+k$ and $-k$, each carrying one photon of every photon pair ⎯ 13

A. Beginning with placement of first switch, find possible first switch positions where first switch connects with two of the N input ports- defined as first layer ⎯ 14

1. Test to determine whether a pair of entangled photons is delivered to each output port and through how many switches. ⎯ 15

2. Eliminate equivalent first switch positions ⎯ 16 a. Equivalent switch positions defined as being where two switch positions can each deliver entangled photon pairs to the same output ports, up to a permutation of the output ports, with the same loss. . ⎯ 17

3. Tally and store the first switch positions that are not equivalent. ⎯ 18

4. If no single switch configuration is able to deliver a pair of entangled photons to each of the N output ports for every possible simultaneous pairing of output ports, another switch is needed. ⎯ 19

FIG. 1

I. Find Equivalent Switching Configurations (continued) ~20

B. Continuing with placement of second switch, find all possible second switch positions where second switch connects with two of the output ports of the multiple first switch positions determined in step A(3). ~21

1. Test to determine whether a pair of entangled photons is delivered to each of the N output ports and through how many switches.

2. Eliminate equivalent second switch positions ~22 a. Equivalent second switch positions defined as being where two switch positions can each deliver entangled photon pairs to the same output ports, up to a permutation of the output ports, with the same loss. ~23

3. Tally the number of switch positions that are not equivalent. ~24

4. Store all possible nonequivalent second switch positions where second switch connects with two of the outputs of the first switch positions found in A(3) above- defined as second layer ~25

5. If no single switch configuration comprising two switches is able to deliver a pair of entangled photons to each of the N output ports for every possible simultaneous pairing of output ports, another switch is needed. ~26

FIG. 2

I. Find Equivalent Switching Configurations (continued) — 27

C. Continuing with placement of third switch. Find all possible third switch positions where third switch connects with two of the output ports of the multiple second switch positions determined in step B(3). — 28

1. Test to determine whether a pair of entangled photons is delivered to each of the N output ports and through how many switches. — 29

2. Eliminate equivalent third switch positions — 30 a. Equivalent third switch positions defined as being where two switch positions can each deliver entangled photon pairs to the same output ports, up to a permutation of the output ports, with the same loss. — 31

3. Tally the number of third switch positions that are not equivalent.

4. Store all possible nonequivalent third switch positions where third switch connects with two of the outputs of the second switch positions found in B(3) above- defined as third layer — 32

5. If no single switch configuration comprising three switches is able to deliver a pair of entangled photons to each of the N output ports for every possible simultaneous pairing of output ports, another switch is needed. — 33

FIG. 3

I. Find Equivalent Switching Configurations (continued)

D. Continuing with placement of fourth switch. Find all possible fourth switch positions where fourth switch connects with two of the output ports of the multiple third switch positions determined in step C(3).

1. Test to determine whether a pair of entangled photons is delivered to each of the N output ports and through how many switches.

2. Eliminate equivalent fourth switch positions a. Equivalent third switch positions defined as being where two switch positions can each deliver entangled photon pairs to the same output ports, up to a permutation of the output ports, with the same loss.

3. Tally the number of fourth switch positions that are not equivalent.

4. Store all possible nonequivalent fourth switch positions where fourth switch connects with two of the outputs of the third switch positions found in C(3) above- defined as fourth iteration/ layer 5. If a pair of photons is not delivered to each of the N output ports with four switches, a fifth switch is needed.

FIG. 4

TABLE I
Notation and Terminology

| SYMBOL/TERM | DEFINITIONS |
|---|---|
| N | Number of users |
| $K = \{\pm 1, ..., \pm N/2\}$ | Photon labels (+1 and −1 designates single pair) |
| $I = \{0, ..., N-1\}$ | Network-inputs (Entangled photon inputs, total = N) |
| $O = \{0, ..., N-1\}$ | Network-outputs (total = N) |
| $U = \{0, ..., N-1\}$ | Users (correlate to network outputs O; total = N) |
| m | Number of switches |
| Configuration | Interconnection ("wiring") of switches |
| State | On/off setting of switch(es) |
| $s \in S_m = \{0,1\}^m$ | Network state (for m-switch network) |
| Route | (State-dependent) path a photon traverses |
| $f \in F$ | Entanglement request |
| Entanglement partners | Users to receive entangled photons |
| $S_f \subseteq S_m$ | Set of states that satisfy $f \in F$ |
| Feasible | Capable of satisfying all $f \in F$ |
| $g_s \in G$ | Mapping from U to K for network state s |
| d | Loss metric |
| * | Optimal value (e.g., $m^*$ and $d^*$) |
| $\pi, \sigma$ | Permutation: a way, especially one of several possible variations, in which a set or number of things can be ordered or arranged |

Network Configurations - Graphical depictions which describes a network configuration. Each switch is depicted by a square, and photon routes are depicted by lines, where photons are assumed to travel from left to right and intersecting lines do not imply a physical connection. Within each switch, parallel lines indicate photons travel through switch and cross lines indicate a cross over of the paths of photons. These parallel or crossed lines may be omitted in the depiction for clarity of presentation.

FIG. 5

II. For the configurations of switches from C(3), examine whether the configurations yield a functional and efficient network A. Input the configurations of switches using the following:

1. Label the N network inputs and the N network outputs each distinctly from $\{0, 1, \ldots, N-1\}$.
2. Bijective mapping (1:1) is used from the set of photons P to the network inputs.
3. The N outputs of the network are then routed to the N correspondingly labeled users (from U).

4. $f(u) : U \rightarrow U$ is a permutation of the users expressible as a product of N/2 disjoint 2-cycles, i.e., $f(u) \neq u$ and $f(u) = v \Rightarrow f(v) = u$. This function represents an *entanglement request* from the users such that $f(u) = v$ implies that users $u$ and $v$ receive entangled photons. In other word, $f(u)$ is the entanglement *partner* of $u$.

5. Set of all such functions is denoted "F" and $|F| = (N-1) \times (N-3) \times \ldots \times 1 = N!/[2^{N/2}(N/2)!]$. (EQUATION 1)

6. Given m switches and their configuration, a network can satisfy an entanglement request $f \in F$ if there exists a network state, i.e., the joint on/off state of the m switches, such that an entangled pair is routed to i and f(i) for each i.

FIG. 6

7. Switches "m" --> {1, 2, ..., m}
State of network "s" = $[s_1 s_2 \ldots s_m]^T \in S_m$, $\{0, 1\}^m$
If $s_i = 0$ or $s_i = 1$ if the ith switch is off or on, respectively.
Each of the 2m network states implies a bijection $g_s$ such that user i receives photon $g_s(i)$ when the network is in state s. The state s and the implied bijection $g_s$ are said to satisfy $f \in F$ if $g_s(f(i)) = -g_s(i)$ for all i. Also, defining $G := \cup_{s \in S_m} g_s$, the request $f \in F$ is satisfiable if there exists $g \in G$ that satisfies f, and if every $f \in F$ is satisfiable for a given network configuration, then that configuration is admissible.

8. For a particular network configuration and entanglement request $f \in F$, let $S_f \subseteq S_m$ be the set of network states that satisfy f. Assume that the network configuration is feasible, so that $S_f \neq \emptyset$ for all $f \in F$.

9. For a network state $s \in S_f$, the number of switches that a photon routed to user $u \in U$ passes through is $d(f, s, u)$.

10. Since the loss associated with each switch is assumed to be independent of the state of the switches, the total loss experienced by a photon routed to u as it traverses the network in state s is proportional to $d(f, s, u)$. To limit the worst-case loss, consider
$d(f, s) := \max_{u \in U} d(f, s, u)$.   (EQUATION 2)

11. Note, however, that one can choose to satisfy f with any $s \in S_f$; so choose s (network state) to minimize $\max_{u \in U} d(f, s, u)$, setting   $d(f) := \min_{s \in S_f} d(f, s)$.   (EQUATION 3)

FIG. 7

12. Guarding against the worst-case entanglement request with respect to $d(f)$, the network *loss metric* is defined by $d := \max_{f \in F} d(f) = \max_{f \in F} \min_{s \in S_f} \max_{u \in U} d(f, s, u)$ (EQUATION 4) with the goal being to minimize $d$.

13. An $N \times N$ network that is feasible and has $m$ switches and loss metric $d$ is an $(N, m, d)$ feasible network.

14. For a fixed $N$, let $m^*$ and $d^*$ be, respectively, the minimum values of the number of switches $m$ and the loss metric $d$ over all feasible $N \times N$ network. Note that we do not guarantee the existence of an $(N, m^*, d^*)$ feasible network. Optimal feasible network not necessarily unique; i.e. $d = d^*$. Multiple solutions with $d = d^*$ can be treated in one of two ways: either all solutions equally good or further optimize the number of switches $m$.

Bounds on $m$ and $d$

15. For an $(N, m, d)$ feasible network, there exists $g \in G$ satisfying each $f \in F$. Clearly each $g \in G$ satisfies exactly one $f \in F$, so we must have $|G| \geq |F|$. Also, $G = \cup_{s \in S_m} \{g_s\}$ implies $|G| \leq |S_m| = 2^m$. Hence, using (Equation 1),
$$m = \log_2(2^m) \geq \log_2 |G| \geq \log_2 |F| = \log_2\{N!/[2^{N/2}(N/2)!]\} \text{ EQUATION 5}$$

16. Since $m^*$ is the value of $m$ for a particular (i.e., optimal in $m$) feasible network, it clear that EQUATION 5 applies to $m^*$ as well. That is,
$$m^* \geq \log_2\{N!/[2^{N/2}(N/2)!]\} \quad \text{(EQUATION 6)}$$

FIG. 8

17. Since $(N,m,d)$ is a feasible network, each of the $m$ switches has two input ports, and in every network state, each of these $2m$ ports are an element of one of the $N$ photon routes from the network input to the network output. It follows from the pigeonhole principle that one of these photon routes will include at least $2m/N$ switches. Hence, for all $f \in F$ and $s \in S_f$, we have $\max_{u \in U} d(f,s,u) \geq 2m/N$, and from (EQUATION 4), $$d \geq \max_{f \in F} \min_{s \in S_f} 2m/N \geq 2m/N. \quad \text{(EQUATION 7)}$$

18. Since $d^*$ is the value of $d$ for a particular (i.e., optimal in $d$) feasible network, then $d^* \geq 2m^*/N$. Substituting the lower bound on $m^*$ of EQUATION 6 (where $m^* \geq \log_2\{N!/[2^{N/2}(N/2)!]\}$) yields $$d^* \geq 2m^*/N \geq (2/N) \log_2\{N!/[2^{N/2}(N/2)!]\}. \quad \text{(EQUATION 8)}$$

III. NETWORK OPTIMIZATION  A. Design Approach

19. For small networks ($N \leq 10$), network configurations are searched to find optimal feasible networks. Because the complexity of the most naive search grows extremely rapidly, a more sophisticated approach is used to reduce the search space. Note that all $N \times N$ network configurations with $m$ switches can be examined by considering all $(_N C_2)^m$ possible $m$-element lists of ordered pairs from $I \times I$, where $_n C_k$ denotes the number of distinct $k$-combinations of $n$ elements.

FIG. 9

20. In doing so, one can arbitrarily fix the mapping of photons +1, −1, +2, −2,..., +N/2, and −N/2 to network inputs 0, 1, 2, 3,..., N − 2, and N − 1, respectively. For each of the $(_NC_2)^m$ configurations, one can examine each network state $\mathbf{s} \in S_m$ and determine $g_\mathbf{s} \in G$. The set of entanglement requests $f$ that are satisfied by the $g_\mathbf{s}$ can be stored along with $d(f)$ from EQUATION 3. If all $f \in F$ are satisfiable, then we conclude that the given network is an $(N,m,d)$ feasible network, where $d = \max_{f \in F} d(f)$. To determine $d^*$, $d$ must be minimized over all feasible networks with any number of switches.

21. For illustration, consider the network of Fig. 12 and label the two switches sequentially from left to right. With $N = 4$, an entanglement request $f \in F$ is completely defined by the value of $f(0)$, so identify $f_u \in F$, $1 \leq u \leq 3$, with the entanglement request for which $f_u(0) = u$. By inspection, $g_\mathbf{s}$ with $\mathbf{s} = [0\ 0]^T$, $[0\ 1]^T$, $[1\ 0]^T$, and $[1\ 1]^T$ satisfies, respectively, $f_1, f_3, f_2$, and $f_2$. Furthermore $d(f) = 2$ for all $f$, since either $d(f,\mathbf{s},1) = 2$ or $d(f,\mathbf{s},3) = 2$ for all $f$ and $\mathbf{s}$. Hence, this is a $(4,2,2)$ feasible network. From EQUATION 6, we must have $m^* \geq \log_2 3 > 1$, and so we conclude that $m^* = 2$. To show that $d^* = 2$, we first eliminate the possibility of a $(4,m,d)$ feasible network with $m > m^*$ and $d < 2$ by applying EQUATION 7 to write $d \geq 2m/N > 2m^*/N = 1$. To eliminate the possibility of a $(4,m^*,d)$ feasible configuration with $d < 2$, we note that all feasible configurations with $m = m^* = 2$ switches are equivalent (after a permutation of labels) to one of two possibilities—$\{(0,1),(2,3)\}$ or $\{(0,2),(1,3)\}$—neither of which can satisfy all $f \in F$. Hence, there does not exist a feasible configuration with $d < 2$, and $d^* = 2$.

FIG. 10

FIG. 11 - EQUIVALENCY

22. EQUIVALENCY DEFINED - Two networks to be equivalent if the functionality and associated loss characteristics of the two networks are the same after some permutation of the user labels and network states. /62

23. MATHEMATICALLY DEFINED EQUIVALENCY for 2 NxN networks (each comprising m switches) - For all entanglement requests $f \in F$, let $S_f^{(1)}$ and $S_f^{(2)}$ denote the set of states of the first and second network that satisfy $f$. (Sets may be empty for network configurations that are not feasible.) For all $f \in F$, $s_1 \in S_f^{(1)}$, $s_2 \in S_f^{(2)}$, and $u \in U$, let $d^{(1)}(f, s_1, u)$ and $d^{(2)}(f, s_2, u)$ denote the loss for the first network in state $s_1$ and the second network in state $s_2$. Two networks are equivalent if there exists permutations $\pi : U \rightarrow U$ (user) and $\sigma : S_m \rightarrow S_m$ (network state) such that $$S_{\pi \circ f \circ \pi^{-1}}^{(2)} = \{\sigma(s) : s \in S_f^{(1)}\} \quad \text{(functionality equal)} \quad \text{(EQUATION 9)}$$
$$d^{(1)}(f, s, u) = d^{(2)}(\pi \circ f \circ \pi^{-1}, \sigma(s), \pi(u)) \quad \text{(losses equal)} \quad \text{(EQUATION 10)}$$

for all $f \in F$, $s \in S_f^{(1)}$, and $u \in U$, where $\circ$ denotes function composition. /63

24. Note that (EQUATION 9) ensures that (EQUATION10) is well defined, even in the case of network configurations that are not feasible. If EQUATION 9 does not hold for particular permutations $\pi$ and $\sigma$, then permutations $\pi$ and $\sigma$ do not satisfy the requirements for equivalence and should not be considered in EQUATION 10. /64

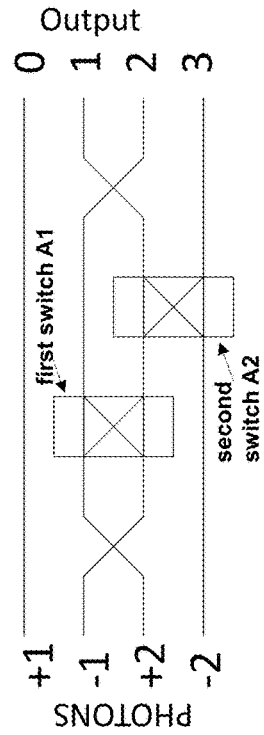

FIG. 12 - Depiction of a 4 x 4 switching network, also disclosed in Herbauts, I., "Demonstration of Active Routing of Entanglement in a Multiuser Environment"

The positions for the second switch result in only four feasible networks, all of which, by direct computation, have $d = 2$ (loss through 2 switches). After examining the 4 feasible networks for equivalence, there is a unique equivalence class of (4,2,2) feasible networks, a representative of which is shown to the right. /65

FIG. 13 DOMINATING NETWORKS

25, DOMINATING NETWORKS- One network dominates another network comprising fewer switches if, after permutation of user labels, the second network can produce the same functionality without increasing signal loss to any user.

26. DOMINATING NETWORKS- MATHEMATICAL EXPRESSION - Consider two $N \times N$ networks such that the first and second networks comprise $m^{(1)}$ and $m^{(2)}$ switches, respectively, with $m^{(2)} < m^{(1)}$. Then the first network is *dominated by* the second network if there exists a permutation $\pi: U \rightarrow U$ and a function $h: S_m(1) \rightarrow S_m(2)$ such that $h(\mathbf{s}) \in S_{\pi \circ f \circ \pi^{-1}}^{(2)}$ and $d^{(1)}(f,\mathbf{s},u) \geq d^{(2)}(\pi \circ f \circ \pi^{-1}, h(\mathbf{s}), \pi(u))$ (EQUATION 11) for all $f \in F$, $\mathbf{s} \in S_f^{(1)}$, and $u \in U$. A network is called a *dominated network* if it is dominated by some other network; otherwise the network is a *nondominated network*. Note that if a dominated subnetwork appears within a given network, that subnetwork can safely be replaced with a subnetwork that dominates it without affecting the networking functionality while improving (or leaving unchanged) the loss characteristics. Hence, in searching for optimal network configurations, the search space can be reduced to those networks that contain no dominated subnetworks.

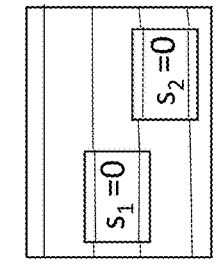

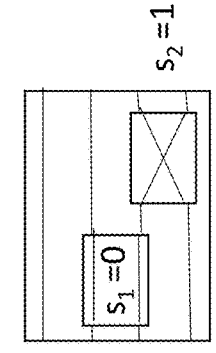

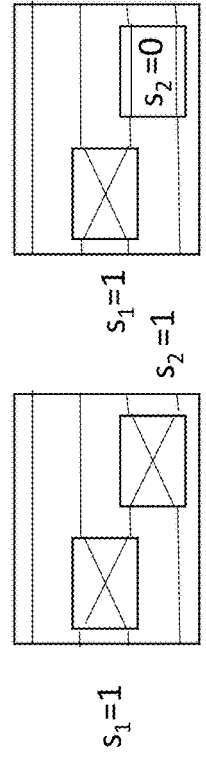

Possible States of a pair of switches

FIG. 14  4 x 4 Network Determination

27. In general, one requires both the network structure as well as a method to determine network states that satisfy entanglement requests by network users. However, for small networks, such as those considered here, it is straightforward to employ a computer program to precompute the entanglement request satisfied by each network state. A (reverse) lookup table can then be constructed and used by a computer program during network operation to select a network state given a particular entanglement request. Therefore only the design of the network configuration is considered.

28. *Network Configuration Search Strategy Applied to 4 × 4 Networks*
For optimal 4 × 4 feasible networks comprising two switches, there exit (4,2,2) feasible networks. Without considering network equivalence or dominance, there exist $(_4C_2)^2 = 36$ possible configurations of two switches, which yields 16 feasible configurations. All 2 × 2 feasible networks have $d = 2$. FIG. 12 illustrates one feasible 4 × 4 network.

29. *Applying Equivalency and Reduction to Dominating Networks* - For the $_4C_2=6$ networks with $N = 4$ and $m = 1$ there is only one nondominated equivalence class, with representative network $\{(0,2)\}$. Other configurations are either equivalent, such as $\{(0,3)\}$, or are dominated by a network with no switches, as is the case for $\{(0,1)\}$. Consequently, it is sufficient to fix the first switch to be $\{(0,2)\}$ when examining 4 × 4 networks with $m = 2$.

30. Searching $_4C_2=6$ positions for the second switch results in only four feasible networks, all have $d = 2$. Searching these four feasible networks for equivalence, there is a unique equivalence class of (4,2,2) (i.e., 4 inputs) feasible networks, a representative of which is given in Fig. 12.

FIG. 15    6 x 6 Network Determination

31. For switching network operation, selection of both network design and network states is required. However, for small networks, it is straightforward to employ a computer program to precompute the entanglement request satisfied by each network state. A (reverse) lookup table can then be constructed and used by a computer program during network operation to select a network state given a particular entanglement request. Therefore, one only needs to consider the design of the network configuration.

6 X 6 NETWORK

32. Using 4 switches, none can satisfy all $f \in F$, and so there does not exist a $(6,m,d)$ feasible network with $m \leq 4$ for any $d$.

33. Adding a fifth switch in each of the $_6C_2=15$ possible positions in turn to each of the 40 class representatives with $m = 4$ yields many feasible configurations with $m=5$ and with values of $d$ ranging from two to four. Hence, $m^* = 5$, and since $d^* \geq 2m^*/N > 1$ by (EQUATION 8), $d^* = 2$.

34. The $(6,5,d)$ feasible networks that have been identified (with $2 \leq d \leq 4$) can be partitioned into 19 equivalence classes, only one of which has $d = d^* = 2$. Hence, all $(6,5,2)$ feasible networks are equivalent to the class representative depicted in Fig. 16. Furthermore, searching over network configurations with $m = 6$ by appending two switches in each of the possible $(_6C_2)^2$ positions in turn to each of the 40 class representatives with $m = 4$ yields no nondominated feasible networks with $d = 2$. From EQUATION 7, all 6 × 6 feasible networks with $m \geq 7$ must have $d \geq 2m/N > 2$, and so it follows that the equivalence class with the representative depicted in Fig. 16 is the unique class of 6 × 6 nondominated feasible networks with $d = d^* = 2$.

FIG. 16    6 X 6 NETWORK

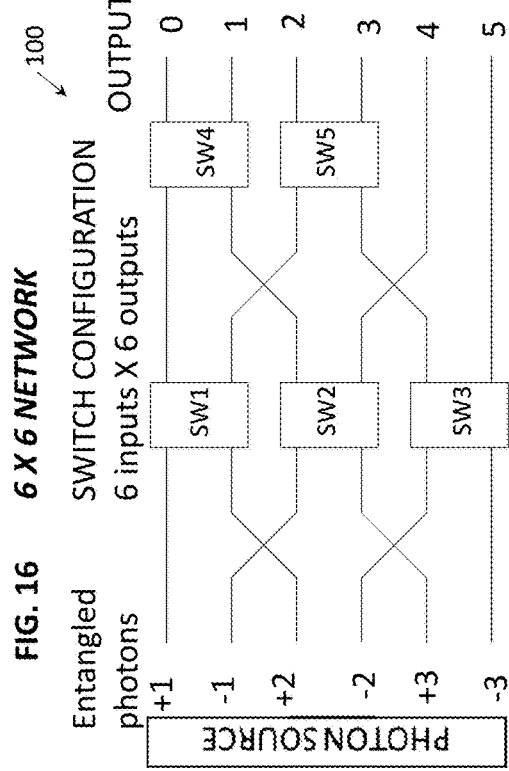

Representative of unique class of (6,5,2) feasible networks ($d = d^* = 2$ and $m = m^* = 5$).

TABLE II – Equivalence Classes for Nondominated Networks

| m | Number of configurations | Representatives |
|---|---|---|
| 0 | 1 | {} |
| 1 | 1 | {(0,2)} |
| 2 | 3 | {(0,2),(0,1)}, {·,(0,4)}, {·,(1,4)} |
| 3 | 12 | {(0,2),(0,1),(0,3)}, {·,(0,4)}, {·,(2,3)}, {·,(0,5)}, {·,(3,4)}, {·,(0,4),(0,1)}, {·,(0,2)}, {·,(2,4)}, {·,(1,5)}, {·,(2,5)}, {·,(1,4),(0,1)}, {·,(3,5)} |
| 4 | 40 | |

Representatives for $m = 4$ are omitted for brevity. Also, "·" is used to indicate numbers repeated from the previous represenative listing. For example, the fifth and sixth class representatives for $m = 3$ are {(0,2),(0,1),(3,4)} and {(0,2),(0,4),(0,1)}, respectively when only {·,(3,4)} & {·,(0,4),(0,1)} appear.

TABLE III
Equivalence Classes of Nondominated 8 × 8 Networks

| m | Number of configurations | Representatives |
|---|---|---|
| 0 | 1 | {} |
| 1 | 1 | {(0,2)} |
| 2 | 4 | {(0,2),(0,1)}, {·,(0,4)}, {·,(1,4)}, {·,(4,6)} |
| 3 | 19 | - |
| 4 | 101 | - |

FIG. 18

35. Table III illustrates the analysis for $N = 8$ listing the characteristics of the equivalence classes of nondominated $8 \times 8$ networks with $m \leq 4$. Searching over network configurations with $m = 7$ by appending three switches in every possible configuration in turn to each of the 101 class representatives with $m = 4$ yields no feasible networks. Hence $m^* \geq 8$. In fact, $m^* = 8$, since the analogous procedure with four additional switches yields many feasible solutions, of which none have $d = 2$ and 21,840 have $d = 3$.

36. The large number of solutions (21,840) makes the determination of equivalence classes computationally challenging. Instead, we determine feasible solutions with $m = 9$ switches by performing the analogous procedure with five additional switches. Doing so yields no feasible solutions with $d = 2$. From EQUATION 7, all $8 \times 8$ feasible networks with $m \geq 10$ have $d \geq 2m/N > 2$, and so we conclude that $d^* = 3$. Hence, the network of Fig. 17 is one of many (potentially nonequivalent) $8 \times 8$ feasible networks with $m = m^* = 8$ and $d = d^* = 3$.

10 x 10 Networks Require Exhaustive Search Methods

37. Exhaustive search methods are needed for $N \geq 10$ networks, though it may be possible by searching over a suboptimally constrained space of configurations. For example, for a $10 \times 10$ network design with $m = 12$ switches the configuration of third through tenth switches is fixed to that of Fig. 17 ($8 \times 8$). Considering all configurations for the remaining four switches results in 16 feasible networks with $d = 3$, such as that depicted in Fig. 19 ($10 \times 10$). This (10,12,3) feasible network has parameters that seem to be reasonably commensurate with the growth of the corresponding parameters of the optimal networks with $N \leq 8$. From EQUATION 6, we have $m^* > 9$, and from EQUATION 8, we have $d^* \geq 2m^*/N \geq 2$. In fact the proposed network is optimal in the loss metric, i.e., $d = d^* = 3$. This can be shown by eliminating the possibility of the existence of (10,10,2) feasible networks through exhaustive examinations of all such networks, since we have from EQUATION 7 that $m > 10 \Rightarrow d > 2$.

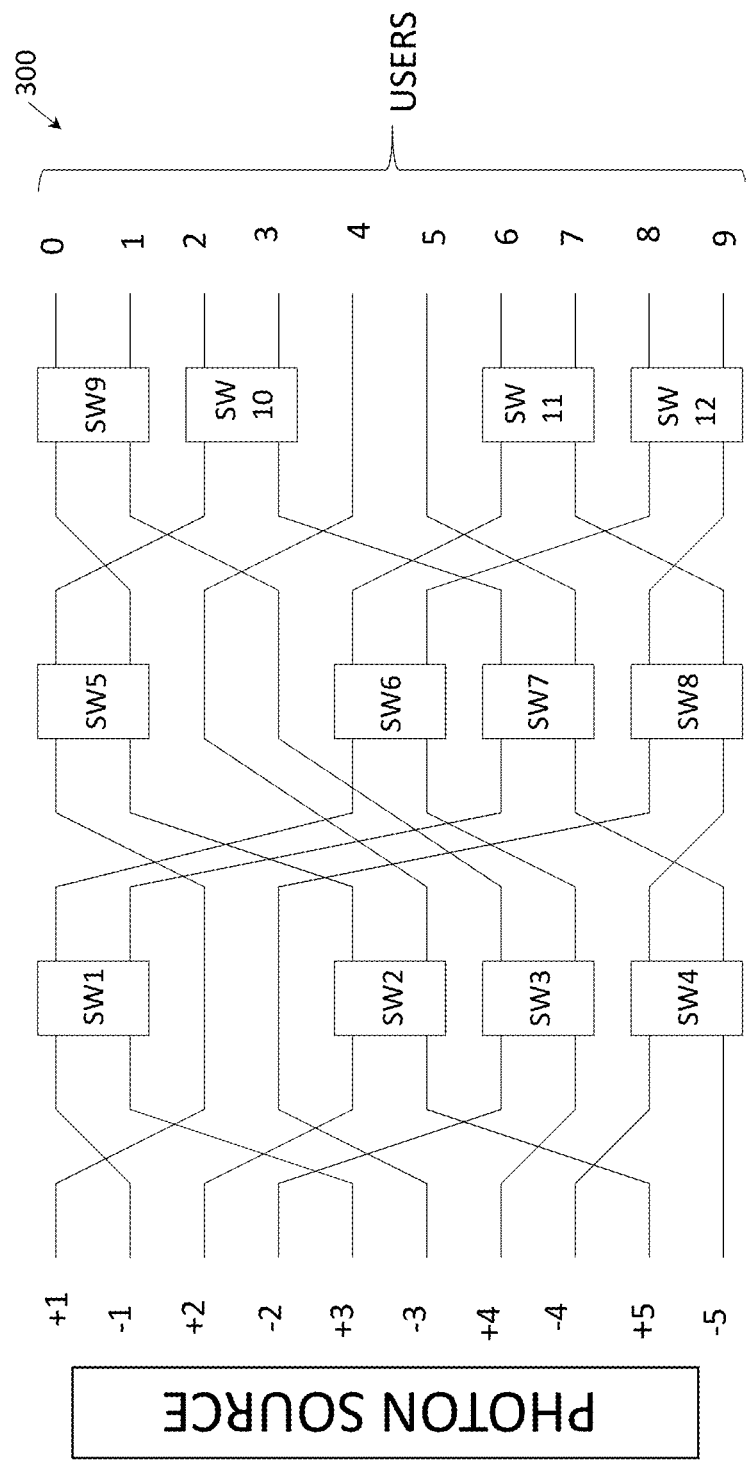
Fig. 19   *10 X 10 NETWORK* - A (10,12,3) feasible network

METHOD AND SYSTEM OF NETWORK SWITCH OPTIMIZATION

STATEMENT OF GOVERNMENT INTEREST

The invention described herein may be manufactured, used, and licensed by or for the United States Government without the payment of royalties.

BACKGROUND OF THE INVENTION

Quantum networks have the potential to enhance the utility of quantum protocols (for, e.g., cryptography, communication, computation, etc.) by enabling the interoperation of multiple quantum systems.

By exploiting peculiar features of quantum mechanics, quantum systems have the potential to deliver new capabilities beyond what is classically possible, and this potential fuels research interest in new areas of quantum computation, quantum communication, and quantum networking. Numerous applications, such as quantum illumination, synthetic aperture, quantum fingerprinting, and quantum appointment scheduling, have been proposed over recent years. The key underpinning feature is a quantum entangled state shared between distant parties. Hence, a critical component of a quantum network functionality is the distribution and the sharing of entanglement between remote network nodes.

One potential approach to entanglement distribution involves a star network architecture, where pairwise entanglement is generated at a central location with the help of nonlinear optical processes and then distributed to pairs of peripheral users located at the network edges. This enables many current protocols that make use of pairwise entanglement between parties, and multipartite higher order entanglement can also be constructed from two particle entanglement.

The reconfigurable star architecture, in which each node could be entangled with any other, is of special interest. Such an architecture could be implemented either with the help of complex and expensive modern telecommunications routing subsystems, such as wavelength selected switches, or with a number of simple commercial off-the-shelf crossbar switches. The latter solution necessitates the understanding of several key points, including how to optically interconnect the switches into an optimal network and how to set the states of the switches for a particular connectivity request. This is rather straightforward for a four-user network, as was recently demonstrated experimentally. However, for networks of more than four users, these key design elements are not trivial.

SUMMARY OF THE INVENTION

The present invention is directed to, inter alia, the distribution of entangled photons to network users. The present invention is directed to optimal photonic switching networks (in terms of insertion loss and the number of component switches) designed to satisfy the particular requirements of entanglement distribution; the switching networks having a predetermined number of inputs and outputs. The present invention is directed to the creation and application of search strategies to design optimal switching networks applicable to nodes with 10 or fewer quantum network neighbors. For all designs, we address the important operation requirement of defining efficient routing algorithms that determine switching network states providing the functionality desired of the switching network at a given time. The combination of optimal switching network structures and associated efficient routing algorithms represents a comprehensive solution to entanglement distribution, thus advancing the state of the art of quantum networks toward practical implementation.

The preferred embodiments may utilize conventional photonic switches to implement a reconfigurable routing network for on-demand pairwise entanglement distribution to greater numbers of users.

The present invention is directed to a preferred method for determining a network configuration for the delivery of entangled photons to a plurality of users such that any user may share one of a pair of entangled photons with any other user; the network comprising a plurality of inputs; a plurality of switches, and a plurality of outputs operatively connected to the inputs by a plurality of optical fibers;

the plurality of switches, each having first and second switch inputs and first and second switch outputs and being switchable between two states, a first state in which the first switch input is connected to the first switch output and the second switch input is connected to the second switch output and a second state in which the first switch input is connected to the second switch output and the second switch input is connected to the first switch output; the method comprising:

determining the minimum number of switches necessary to deliver entangled photon pairs from a predetermined number of sources to a predetermined number of users, minimizing the loss experienced by an entangled photon passing through the switches by minimizing the number of switches that any one photon passes through by selecting only nondominated switch configurations;

determining the minimum number of equivalent network switch configurations and eliminating all but one of the equivalent network switch configurations; and selecting an optimum network configuration by which the plurality of inputs and the plurality of outputs are operatively interconnected so as to enable the delivery of one of pair of entangled photons to each of the output ports using a minimum number of switches in any route connecting each of the plurality of outputs to the plurality of inputs.

The present invention is also directed to an optimal network configuration for the delivery of entangled photons to a plurality of users at corresponding outputs such that any one user may share one of a pair of entangled photons with any other user; the network comprising a plurality of inputs; a plurality of switches, and a plurality of outputs operatively connected to the inputs by a plurality of optical fibers and the plurality of switches;

each of the plurality of switches having first and second switch inputs and first and second switch outputs and being switchable between two states, a first state in which the first switch input is connected to the first switch output and the second switch input is connected to the second switch output and a second state in which the first switch input is connected to the second switch output and the second switch input is connected to the first switch output;

the number of switches necessary to deliver entangled photon pairs from six or more sources to six or more users being the minimum number so as to minimize the loss experienced by an entangled photon passing through the switches such that any one photon passes through only nondominated subnetwork configurations, and wherein the plurality of inputs are operatively connected to the plurality of outputs by a minimum number of switches so as to enable the delivery of one of a pair of entangled photons to each of the output ports using a minimum number of switches in any route connecting each of the plurality of outputs to the plurality of inputs.

BRIEF DESCRIPTION OF THE DRAWINGS

The foregoing and other objects, features, and advantages of the invention will be apparent from the following more detailed description of the preferred embodiments of the invention, as illustrated in the accompanying drawings, wherein:

FIG. 1 is a flow chart showing a depiction of steps (boxes 11-19) involved in determining optimal placement of the first switch in a network switching configuration having N input and N output ports with the objective of delivering a pair of entangled photons to each of the N ports using a minimum number of switches in any stream connecting the N output ports.

FIG. 2 is a flow chart showing a depiction of steps (boxes 20-26) involved in determining optimal placement of the second switch in a network switching configuration having N input and N output ports with the objective of delivering a pair of entangled photons to each of the N ports using a minimum number of switches in any stream connecting the N output ports.

FIG. 3 is a flow chart showing a depiction of steps (boxes 27-33) involved in determining optimal placement of the third switch in a network switching configuration having N input and N output ports with the objective of delivering a pair of entangled photons to each of the N ports using a minimum number of switches in any stream connecting the N output ports.

FIG. 4 is a flow chart showing a depiction of steps (boxes 34-40) involved in determining optimal placement of the fourth switch in a network switching configuration having N input and N output ports with the objective of delivering a pair of entangled photons to each of the N ports using a minimum number of switches in any stream connecting the N output ports.

FIG. 5 is an illustration showing a table of notation and terminology used to determine optimal configurations of the preferred embodiment switching networks.

FIG. 6 is an illustration of the steps (boxes 41-46) for determining the switching configurations that yield a functional and efficient network showing that a network can satisfy an entanglement request f∈F if there exists a network state "s," i.e., the joint on/off state of the m switches, such that an entangled pair is routed to i and f(i) for each i.

FIG. 7 is an illustration of the steps for determining the switching configurations that yield a functional and efficient network showing a procedure defining the number of switches that a photon routed to user u∈U passes through is d(f,s,u).

FIG. 8 is an illustration of the steps for determining optimal switching configurations.

FIG. 9 is an illustration of the steps for determining optimal switching configurations including network optimization.

FIG. 10 is an illustration including a discussion of the network shown in FIG. 12.

FIG. 11 is an illustration depicting steps relating to the finding of equivalency.

FIG. 12 is a depiction of a 4×4 switching network

FIG. 13 is an illustration directed to the concept of dominating networks. One network dominates another network comprising fewer switches if, after permutation of user labels, the second network can produce the same functionality without increasing signal loss to any user.

FIG. 14 is an illustration directed to a discussion of the design of a 4×4 network.

FIG. 15 is an illustration directed to a discussion of the design of a 6×6 network.

FIG. 16 is an illustration showing the design of a 6×6 network and equivalence classes for nondominated networks.

FIG. 18 is an illustration containing a description of the 8×8 network of FIG. 17 and a description of the 10×10 network of FIG. 19

FIG. 19 is a schematic diagram of a 10×10 network.

Figure 17:
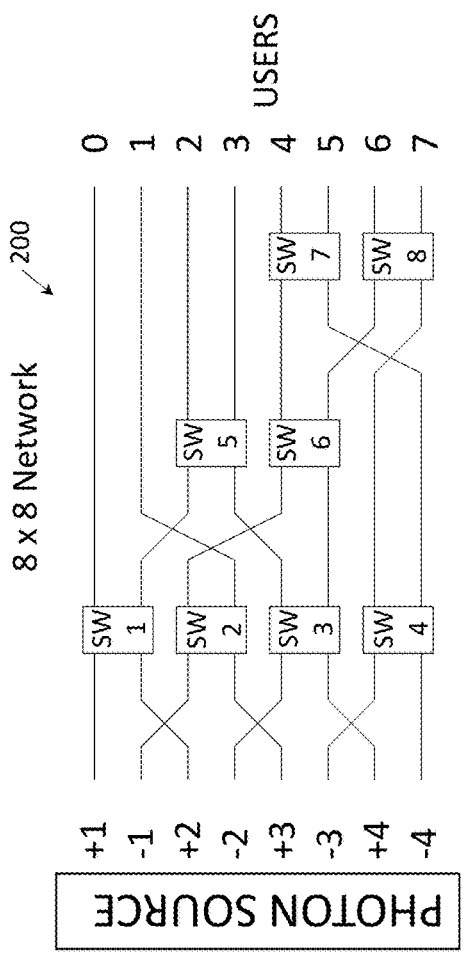
FIG. 17 is an illustration showing a diagram of an 8×8 (8,8,3) feasible network (d=d*=3 and m=m*=8) and Table 3 showing equivalence classes for an 8×8 network.

A more complete appreciation of the invention will be readily obtained by reference to the following Description of the Preferred Embodiments and the accompanying drawings in which like numerals in different figures represent the same structures or elements. The representations in each of the figures are diagrammatic and no attempt is made to indicate actual scales or precise ratios. Proportional relationships are shown as approximates.

DESCRIPTION OF THE PREFERRED EMBODIMENTS

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention. Rather, these embodiments are provided so that this disclosure will be thorough and complete, and will fully convey the scope of the invention to those skilled in the art. In the drawings, the dimensions of objects and regions may be exaggerated for clarity. Like numbers refer to like elements throughout. As used herein the term "and/or" includes any and all combinations of one or more of the associated listed items.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element such as an object, layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that, although the terms first, second, etc. may be used herein to describe various elements, components, regions, layers and/or sections, these elements, components, regions, layers and/or sections should not be limited by these terms. For example, when referring first and second switches, these terms are only used to distinguish one switch from another switch. Thus, a first element, component, region, layer or section discussed below could be termed a second element, component, region, layer or section without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention is directed to a system and method for the distribution of entanglement to network neighbors given a number of sources of entangled photon pairs at a particular network node. In particular, the present invention is directed to optimal (in terms of insertion loss and the number of component switches) photonic switching networks designed to satisfy the particular requirements related to entangled photon distribution. The method and system is such that any one user may share one of a pair of entangled photons with any other user while simultaneously allowing remaining users to also share an entangled pair with a desired user. Beginning with a rigorous framework for the study of such entanglement distribution switching networks, a search strategy is devised and applied to design optimal switching networks applicable to nodes with 10 or fewer quantum network neighbors. For all designs, efficient routing algorithms are addressed that determine a switching network state providing the functionality desired of the switching network at a given time. The combination of optimal switching network structures and associated efficient routing algorithms represents a complete solution to entanglement distribution, thus advancing the state of the art of quantum networks toward practical implementation.

In the following, a framework is presented for studying entanglement distribution switching networks, developing various notation and terminology, as summarized in Table I (shown in FIG. 5) that are used herein. Beginning with a set of N/2 sources of random entangled photon pairs, the sources are labeled $\{1, 2, \ldots, N/2\}$, with the kth source having two outputs labeled $+k$ and $-k$, each carrying one photon for every photon pair output by source k. The individual photons are labeled with the labels of the corresponding outputs, denoting the set of these labels by $K:=\{\pm 1, \pm 2, \ldots, \pm N/2\}$. In practice, fewer than N/2 sources might be capable of producing the desired photon pairs. For example, certain nonlinearities can generate photon pairs at different but fixed wavelengths from a single laser source. Upon demultiplexing of the wavelengths, there are N outputs that carry photon pairs with fixed entanglement properties as above.

Note that the photon labels $\pm k \in K$ refer to all photons emitted by source k and not necessarily to any particular pair of photons from source k. Thus, in embodiments for the routing of photons, under consideration is the routing of all photons emitted from the corresponding source output, where the emission times might be unknown, random, and/or asynchronous with other sources. In the following, to simplify the presentation, the disclosure focuses on the routing a particular pair of photons from each source, but the invention encompasses a broader applicability implicitly. The goal is to design switching networks that route the N/2 pairs of entangled photons to a set of N users according to pairwise entanglement requests by the users as depicted in Boxes 11-13 of FIG. 1. Note that these users, which are labelled uniquely from the set $U:=\{0, 1, \ldots, N-1\}$, are abstractions of network nodes and, thus, may by physically near (e.g., in quantum computing networks) or distant (e.g., in quantum communication networks).

The N photon-source outputs are connected to an N×N switching network. Preferably the preferred embodiments described herein comprise sets of 2×2 crossbar switches, where the number of switches m and their interconnection, or configuration, are design parameters. However, alternate switch designs are within the scope of the present invention. Network configurations also include the mapping between photon-source outputs and network inputs, since proper operation of the network generally depends on the photons input to the network having particular entanglement pairings. Exemplary representations for network configurations are presented in FIGS. 12, 16, 17 and 19. Throughout, the term switch refers to a mathematical abstraction with the functionality of the standard physical component. Such switches are reasonable theoretical building blocks for the construction of complex networks and can be implemented either with discrete components or in an integrated fashion. For example, 1×1, 1×2, 2×3 MEMS-switch cube from CUBO, Optics AG, Robert-Koch Strasse, 55129 Mainz, Germany may be utilized (the specification of which accompanying this application is hereby incorporated by reference) The 2×2 opto-mechanical crossbar switches are available commercially at low cost, exhibiting reasonable insertion loss of, e.g., less than 1 dB.

Regardless of the physical manifestation, 2×2 crossbar switches (SW1-12) have two input ports, two output ports, and a control input that turns the switch on or off. The on or off condition of the switch is called the switch state, represented herein by a variable s such that s=0 or s=1 when the switch is in the "off" or "on" state, respectively. A signal input to the first (second) input port emerges at the first (second) output port when the switch is in the "off" state, i.e., s=0, and emerges at the second (first) output port when the switch is in the "on" state, i.e., s=1. It is assumed that each signal experiences a fixed insertion loss independent of the state of the switch. The combined state of all switches in the network is referred to as the network state. Given a particular network state, a photon entering a network input will emerge (unless lost through attenuation) at a particular network output. This input/output relationship is one-to-one for each network state, and so that each network state produces some permutation of the input at the output.

In the drawings, the N network inputs and the N network outputs each distinctly labeled from $I=\{0, 1, \ldots, N-1\}$ and $O=\{0, 1, \ldots, N-1\}$, respectively. (Note that as sets, U=I=O, but different variables may be employed as suggestive notation for clarity herein.) The (one-to-one) connections between the N photon-source outputs and the N network inputs is represented by a bijection from K to I. As used herein, the term bijection refers to a one-to-one relationship. There is freedom in choosing this bijection, but once chosen, the mapping is fixed, and the routing of photons can only be changed by toggling component switch states. Similarly, the (one-to-one) connections between the N network outputs and the N users are also represented by a bijection from O to U. There is again freedom in choosing this bijection, but without loss of generality (w.l.o.g.), it can be assumed that output $i \in O$ is routed to user $i \in U$.

Let $f(u): U \rightarrow U$, be a permutation of the users expressible as a product of N/2 disjoint 2-cycles, i.e., $f(u) \neq u$ and $f(u)=v \Rightarrow f(v)=u$. (Box 44) This function represents an entanglement request from the users such that $f(u)=v$ implies that users u and v are to receive entangled photons. As used herein, f(u) is the partner of u and u and f(u) are entanglement partners. The set of all such functions is denoted by F, and $$|F|=(N-1) \times (N-3) \times \ldots \times 1 = N!/[2^{(N/2)}(N/2)!].$$ (EQUATION 1) (Box 45)

Given m switches and their configuration, as defined, the network can satisfy an entanglement request $f \in F$ if there exists a network state in which an entangled photon pair is routed to u and f(u) for each $u \in U$. (Box 46) Note, in particular, that once a network is placed in a network state satisfying a particular entanglement request, the routing of photons is static, as opposed to, for example, routing requiring high-speed toggling of switches depending on the particular photons that have been introduced into the network at a particular time. Until the users alter the entanglement request, the network remains in the given state, and subsequently introduced are photon pairs that continue to be routed to the corresponding users.

Shown in FIG. 12 is a depiction of a 4×4 switching network, equivalent to that studied and implemented in Herbauts, B. Blauensteiner, A. Poppe, T. Jennewein, and H. Hubel, "Demonstration of active routing of entanglement in a multi-user network," Appl. Opt., vol. 21, pp. 29 013-29 024, November 2013, herein incorporated by reference in its entirety.

More precisely, for a given network configuration, consider an arbitrary but distinct labeling of the m switches from $\{1, 2, \ldots, m\}$. The network is represented state by a vector $s=[s\_1 \ s\_2 \ldots s\_m]^T \in S\_m, \{0,1\}^m$, where $s\_i=0$ or $s\_i=1$ if the ith switch is off or on, respectively. Each of the 2m network states implies a bijection $g\_s:U \rightarrow K$ such that user u receives photon $g\_s(u)$ when the network is in state s. The set of all such bijections is denoted by $G := \cup\_(s \in S\_m) \{g\_s\}$. The state s and the implied bijection $g\_s$ are said to satisfy the entanglement request $f \in F$ if $g\_s(f(u))=-g\_s(u)$ for all u. The entanglement request $f \in F$ is satisfiable by the network configuration if there exists $g \in G$ that satisfies f. If every entanglement request $f \in F$ is satisfiable for a given network configuration, then that network and its configuration are feasible. The objective is to design feasible network configurations optimizing particular design criteria that are developed the following, Descriptions of Network Configurations To describe network configuration designs, graphical depictions are often employed, an example of which is given by FIG. 12. Each switch is depicted by a rectangle and possible photon routes are depicted by lines, where photons are assumed to travel from left to right and intersecting lines do not imply a connection except at switch ports (i.e., when lines intersect at a rectangle). The lines external to the switches describe how the switches are interconnected, whereas lines within a switch depict the possible routing of photons depending on the switch state. Specifically, parallel lines depict the routing of photons when the switch is off and crossed lines depict the routing of photons when the switch is on. (The lines within the switches are omitted elsewhere herein for clarity of presentation.) The network inputs are represented by disconnected lines on the left, and, w.l.o.g., an assumption is made that these inputs are numbered (from I) sequentially from top to bottom. The correspondence between the photon-source outputs K and network inputs I is then given by labeling the ends of these disconnected lines with the appropriate photon labels. Similarly, the network outputs are given by disconnected lines on the right and, w.l.o.g., are assumed to be numbered (from O) sequentially from top to bottom. As noted in herein, it can be assumed that the network outputs O and users U are in direct correspondence, as depicted with the user labels on the ends of the disconnected lines on the right.

Next, a textual description of network configurations is developed. Referring to FIG. 12, where the first switch "A1" and the second switch "A2" are shown. Note that the network configuration is independent of the state of the network, but it will be notationally convenient to consider how photons are routed when the network is in the all-zero state (i.e., when all switches are off). Essentially, the connectivity of a given switch input port is defined in terms of the input from which photons arriving at that port originate when the network is in the all-zero state. For example, the top port of switch A2 in FIG. 12 receives photons from network input 1 (corresponding, in this case, to photon −1) when the network is in the all-zero state. These values may be combined for the input ports of the given switch into a pair, for example, the pair (1,3) for switch A2 of FIG. 12. Note that the order in which these values are listed in the pair is immaterial, as the description will remain consistent if reversed.

Next, an ordering of the switches in the network is considered such that the photons routed to the input ports of switch i do not pass through any switches i'>i. (Such an ordering need not be unique.) In FIG. 12, one cannot choose the switch order (A2,A1), because photons (from input 1 when in the all-zero network state) routed to the top port of switch A2 pass through switch A1. Hence, in this case one must choose switch A1 and A2 to be the first and second switch, respectively. The ordered pairs that were previously determined for each switch may be listed in an ordered set according to the chosen switch order. In the case of FIG. 12, the result is $\{(1,2),(1,3)\}$. This list specifies all connections between network and switch inputs and the interconnections between switches.

Thus far, a partial textual description of the network configuration has been provided, without the mapping between photon-source outputs and the network inputs or how the output network ports are connected to the rest of the switching network. One can explicitly provide the former mapping; in FIG. 12, photon-source outputs +1, −1, +2, and −2 are connected to network inputs 0, 1, 2, and 3, respectively. As for specifying the output connectivity, it is again sufficient to consider the all-zero state of the network, providing the associated mapping from the network inputs to network outputs. For example, in FIG. 12, photons originating from network inputs 0, 1, 2, and 3 are routed to network outputs 0, 1, 2, and 3, respectively, when the network is in the all-zero state. However, the specification of this last mapping is generally omitted, since an alternative mapping amounts to a trivial relabeling of the users.

Design Objectives

Essentially, the objective is to construct feasible network configurations that minimize the worst-case insertion loss. Note that the definition of a feasible configuration places no restriction on the relationship between network states satisfying any two entanglement requests. For example, suppose a feasible network is operating in a particular network state, and then a subset of users wish to modify their entanglement pairings. The new entanglement request is certainly satisfiable (since the network is feasible), but satisfying the request may require the routes of all photons to be adjusted. This is similar to the notion of rearrangeable nonblocking in standard telecommunications networks. However, a typical telecommunication network design aims to produce any permutation of the input at the output, a capability that places greater restrictions on the network design than is necessary for our application. The network is not required herein to allow users to specify the labels of the photons that will be routed to them, guaranteeing only that for each entanglement request f∈F, there exists g∈G with g(u)=−g(f(u)) for all u∈U. (Box 47) Since the design constraint is less restrictive, it follows that there may be design freedom that can be used to optimize a given metric as expressed in Herbauts, B. Blauensteiner, A. Poppe, T. Jennewein, and H. Hubei, "Demonstration of active routing of entanglement in a multi-user network," Appl. Opt., vol. 21, pp. 29 013-29 024, November 2013, herein incorporated by reference in its entirety.

For a particular network configuration and entanglement request f∈F, let S_f⊆S_m be the set of network states that satisfy f. Assume that the network configuration is feasible, so that S_f≠∅ for all f∈F. (Box 48) For a network state s∈S_f, the number of switches that a photon routed to user u∈U passes through is denoted by d(f,s,u). (Box 49) Since the loss associated with each switch is assumed to be independent of the state of the switches, the total loss experienced by a photon routed to u as it traverses the network in state s is proportional to d(f,s,u). The following equation is considered to limit the worst-case loss:

$$d(f,s):=\max\_(u \in U)d(f,s,u). \quad \text{(EQUATION 2) (Box 50)}$$

Note, however, that one can choose to satisfy f with any s∈S_f, and so naturally s is chosen to minimize the following:

Max_(u∈U)d(f,s,u), setting $$d(f):=\min\_(s \in S\_f)d(f,s). \quad \text{(EQUATION 3) (Box 51)}$$

Guarding against the worst-case entanglement request with respect to d(f), the network loss metric is defined by $$d:=\max\_(f \in F)d(f)=\max\_(f \in F)\min\_(s \in S\_f)\max\_(u \in U)d(f,s,u) \quad \text{(EQUATION 4) (Box 52)}$$

and aim to design a feasible network configuration that minimizes d. A feasible N×N network with m switches and loss metric d is referred to as an (N,m,d) feasible network. (Box 53)

For fixed N, m* and d* are, respectively, the minimum values of the number of switches m and the loss metric d over all feasible N×N network. (Box 54) Note that the existence of an (N, m*,d*) feasible network is not guaranteed. (Box 54) Also, there is no reason to suspect that there is a unique feasible network with d=d*. Indeed, trivially different configurations can be obtained simply by permuting the user labels or photon source labels or flipping the signs of a set of photon pairs or the input ports of a set of switches. Whether trivially different or otherwise, such multiple solutions with d=d* are treated in one of two ways: either one considers all solutions equally good or the number of switches m is further optimized. Reducing m may reduce the cost and bulk of the network when implemented with discrete components, but it may also break symmetries that can be useful in describing, studying, and implementing a designed network.

Bounds on m and d

Bounds on the parameters m and d are derived (and, hence, bounds on the optimal values m* and d*) for feasible networks as a function of N. For an (N,m,d) feasible network, there exists g∈G satisfying each f∈F. Clearly each g∈G satisfies exactly one f∈F, so one must have |G|≥|F|. Also, G=U_(s∈S_m) {g_s} implies |G|≤|S_m|=2m. Hence, using EQUATION 1, $$m=\log\_2(2m) \geq \log\_2|G| \geq \log\_2|F|=\log\_2\{N!/[2^{(N/2)}(N/2)!]\}. \quad \text{(EQUATION 5) (Box 55)}$$

Since m* is the value of m for a particular (i.e., optimal in m) feasible network, it clear that EQUATION 5 applies to m* as well. That is, $$m^* \geq \log\_2\{N!/[2^{(N/2)}(N/2)!]\}. \quad \text{(EQUATION 6) (Box 56)}$$

Now, again considering an (N,m,d) feasible network, it is noted that each of the m switches has two input ports, and in every network state, each of these 2m ports are an element of one of the N photon routes from the network input to the network output. It follows from the pigeonhole principle that one of these photon routes will include at least 2m/N switches. Hence, for all f∈F and s∈S_f, the max_(u∈U) d(f,s,u) 2m/N, and from EQUATION 4, $$d \geq \max\_(f \in F)\min\_(s \in S\_f)2m/N \geq 2m/N \geq 2m^*/N. \quad \text{(EQUATION 7) (Box 57)}$$

Since d* is the value of d for a particular (i.e., optimal in d) feasible network, it is clear that d*≥2m*/N as well. Substituting the lower bound on m* of EQUATION 6 yields $$d^* \geq 2m^*/N \geq (2/N)\log\_2\{N!/[2^{(N/2)}(N/2)!]\}. \quad \text{(EQUATION 8) (Box 58)}$$

Network Optimization—Design Approach

For small networks (N≤10), network configurations are exhaustively searched over to find optimal feasible networks. Because the complexity of the most naive search grows extremely rapidly, more sophisticated approaches have been developed to reduce the search space. The processes that are employed are shown and summarize results obtained by computer-based searches are shown, including intermediate results that characterize aspects of the design space.

In light of the textual description of network configurations described in the foregoing, it is noted that all N×N network configurations with m switches can be examined by considering all C(N,2)^m possible m-element lists of ordered pairs from |×|, where C(n,k) denotes the number of distinct k-combinations of n elements. (Box 59) In doing so, one can arbitrarily fix the mapping of photons +1, −1, +2, −2, . . . , +N/2, and −N/2 to network inputs 0, 1, 2, 3, . . . , N−2, and N−1, respectively. For each of the C(N,2)^m configurations, one can examine each network state s∈S_m and determine g_s∈G. The set of entanglement requests f that are satisfied by the g_s can be stored along with d(f) from EQUATION 3. If all f∈F are satisfiable, then one conclude that the given network is an (N,m,d) feasible network, where d=max_(f∈F) d(f). To determine d*, d must be minimized over all feasible networks with any number of switches. (Box 60)

For illustration, consider the 4×4 network of FIG. 12 with two switches sequentially from left to right (A1, A2). (Box 61) With N=4, an entanglement request f∈F is completely defined by the value of f(0), so f_u∈F, 1≤u≤3, is identified with the entanglement request for which f_u(0)=u. By inspection, g_s with s=[0 0]^T, [0 1]^T, [1 0]^T, and [1 1]^T satisfies, respectively, f_1, f_3, f_2, and f_2. Furthermore d(f)=2 for all f, since either d(f,s,1)=2 or d(f,s,3)=2 for all f and s. Hence, this is a (4,2,2) feasible network. From EQUATION 6, m*≥log_2 3>1, and so it is concluded that m*=2. To show that d*=2, the possibility of a (4,m,d) feasible network with m>m* and d<2 is eliminated by applying EQUATION 7 to write d≥2m/N>2m*/N=1. To eliminate the possibility of a (4,m*,d) feasible configuration with d<2, it is noted that all feasible configurations with m=m*=2 switches are equivalent (after a permutation of labels) to one of two possibilities—{(0,1),(2,3)} or {(0,2),(1,3)}—neither of which can satisfy all f∈F. Hence, there does not exist a feasible configuration with d<2, and therefore d*=2.

It will also be useful to be able to identify equivalence classes of network configurations (feasible or not), as this will allow us to reduce the configuration search space by eliminating combinations of switches that are equivalent. Essentially, two networks are deemed to be equivalent if the functionality and associated loss characteristics of the two networks are the same after some permutation of the user labels and network states. (Box 62) Below is a rigorous definition of the equivalence of two networks.

Consider two N×N networks, each comprising m switches. For all entanglement requests f∈F, let S_f^(1) and S_f^(2) denote the set of states of the first and second network, respectively, that satisfy f. (Note that these sets may be the empty set in the case of network configurations that are not feasible.) For all f∈F, s_1∈S_f^(1), s_2∈S_f^(2), and u∈U, let d^(1)(f,s_1, u) and d^(2)(f,s_2, u) denote the loss experienced by a photon routed to user u when, respectively, the first network is in state s_1 and the second network is in state s_2. The two networks are equivalent if there exists permutations π:U→U and σ:S_m→S_m such that $$S\_(\pi \circ f \circ \pi\char`\^-1)\char`\^(2)=\{\sigma(s):s \in S\_f(1)\} \quad \text{EQUATION 9 (Box 63)}$$

and $$d\char`\^(1)(f,s,u)=d\char`\^(2)(\pi \circ f \circ \pi\char`\^-1,\sigma(s),\pi(u)) \quad \text{(EQUATION 10) (Box 64)}$$

for all f∈F, s∈S_f^(1), and u∈U, where ∘ denotes function composition. Note that EQUATION 11 ensures that EQUATION 12 is well defined, even in the case of network configurations that are not feasible. That is, if EQUATION 11 does not hold for particular permutations π and σ, then those permutations do not satisfy the requirements for equivalence and should not be considered in EQUATION 12. It is straightforward to show that the above definition of equivalence represents a valid equivalence relation and, therefore, implies a partition of N×N networks into sets of equivalence classes.

The network is optimized when any one of the subnetwork configurations that enable one of the plurality of photons to travel from an input port to an output port contains the minimum number of switches. For example, consider two routings of switches where N photons travels alternate routes. The first routing requires the first photon to pass through four switches, the second photon to pass through four switches, the third photon to pass through four switches, . . . and the nth photon to pass through four switches. The second routing requires the first photon to pass through three switches, the second and fourth photons to pass through four switches, the third photon to pass through five switches, . . . and the nth photon to pass through four switches. The first routing is preferable to the second routing in that the determination is made based upon the route requiring the greatest number of switches, i.e., the route of the third photon.

A similar concept that will also be useful is that of one network dominating another. Essentially, one N×N network is dominated by a second N×N network comprising fewer switches if, after a permutation of user labels, the second network can produce the same functionality as the first network without increasing the signal loss to any user. (Box 66) To be rigorous, consider two N×N networks such that the first and second networks comprise m^(1) and m^(2) switches, respectively, with m^(2)<m^(1). Then the first network is dominated by the second network if there exists a permutation π:U→U and a function h: S_m^(1)→S_m^(2) such that h(s)∈S_(π∘f∘π^-1)^(2) and $$D\char`\^(1)(f,s,u) \ge d\char`\^(2)(\pi \circ f \circ \pi\char`\^-1,h(s),\pi(u)) \quad \text{(EQUATION 11) (Box 67)}$$

for all f∈F, s∈S_f^(1), and u∈U. A network is called a dominated network if it is dominated by some other network; otherwise the network is a nondominated network. Note that if a dominated subnetwork appears within a given network, that subnetwork can safely be replaced with a subnetwork that dominates it without affecting the networking functionality while improving (or leaving unchanged) the loss characteristics. Hence, in searching for optimal network configurations, the search space can be reduced to those networks that contain no dominated subnetworks.

Network Configuration Search Strategy Applied to 4×4 Networks (Box 68)

To illustrate the above definitions and their utility, consider the problem of determining optimal 4×4 feasible networks comprising two switches, i.e., (4,2,2) feasible networks. (Box 68) Exhaustive search for 4×4 feasible networks with m=2 over all network configurations without considering network equivalence or dominance requires the examination of each of the C(4,2)^2=36 possible configurations of two switches. (Boxes 69-70) This yields 16 feasible configurations. One can then optimize the loss metric over these 16 feasible configurations by direct computation of the loss metric for each case. The result is that all 2×2 feasible networks have d=2; one such network is given in FIG. 12. (Box 71)

Alternatively, the search space can be reduced by considering only one representative of each equivalence class of subnetworks (i.e., the placement of a single switch) and by eliminating dominated subnetworks. For example, an exhaustive search over the C(4,2)=6 networks with N=4 and m=1 reveals only one nondominated equivalence class, with representative network {(0,2)}. Other configurations are either equivalent, such as {(0,3)}, or are dominated by a network with no switches, as is the case for {(0,1)}. Consequently, it is sufficient to fix the first switch to be {(0,2)} when examining 4×4 networks with m=2. Searching over the C(4,2)=6 possible positions for the second switch results in only four feasible networks, all of which, by direct computation, have d=2. Finally, each of these four feasible networks (instead of the 16 that were found by searching the entire configuration space) are examined for equivalence, arriving at the conclusion that there is a unique equivalence class of (4,2,2) feasible networks, a representative of which is given in FIG. 12. This approach generally reduces the computations needed to determine an optimal network while providing additional information regarding the relationship (i.e., equivalence) of solutions, as shown in Table II (see FIG. 16).

TABLE II

=Equivalence Classes of Nondominated 6 × 6 Networks

| m | number | representatives |
|---|--------|-----------------|
| 0 | 1 | { } |
| 1 | 1 | {(0,2)} |
| 2 | 3 | {(0,2),(0,1)}, {•,(0,4)}, {•,(1,4)} |
| 3 | 12 | {(0,2),(0,1),(0,3)}, {•,•,(0,4)}, {•,•,(2,3)}, {•,•,(2,4)}, {•,•,(3,4)}, {•,(0,4),(0,1)}, {•,•,(0,2)}, {•,•,(0,5)}, {•,•,(1,5)}, {•,•,(2,5)}, {•,(1,4),(0,1)}, {•,•,(3,5)} |
| 4 | 40 | — |

Results

Results are obtained for 6×6 (preferred embodiment 100), 8×8 (preferred embodiment 200), and 10×10 (preferred embodiment 300) network designs. Note that in implementing and operating a switching network, one requires both the network structure as well as a method to determine network states that satisfy entanglement requests by network users. (Box 72) However, for small networks, such as those considered here, it is straightforward to employ a computer program to compute the entanglement request satisfied by each network state. A (reverse) lookup table can then be constructed and used by a computer program during network operation to select a network state given a particular entanglement request. Therefore, only the design of the network configuration is considered.

For N=6, equivalence classes of all nondominated networks for m≤4 are characterized. (Similar to the example in the foregoing, the equivalence classes of nondominated networks with m switches can be used to reduce the search space of configurations with m'>m switches.) Table II (FIG. 16) lists the corresponding number of such classes along with representative of each class, where, for brevity, representatives for m=4 are omitted and "•" is used to indicate that a switch is in the same position as the corresponding switch of the previous representative in the list. For example, the fifth and sixth class representatives for m=3 are {(0,2),(0,1),(3,4)} and {(0,2),(0,4),(0,1)}, respectively. The seventh class representative is {(0,2),(0,4), (0,2)} and the eighth is {(0,2)(0,4),(0,5)}.

Examining each class representative, none can be found to satisfy all f∈F, and so there does not exist a (6,m,d) feasible network with m 4 for any d. (Box 73) Searching over network configurations obtained by appending a fifth switch in each of the C(6,2)=15 possible positions in turn to each of the 40 class representatives with m=4 yields many feasible configurations with values of d ranging from two to four. Hence, m*=4, and since d*≥2m*/N>1 by EQUATION 8, we have d*=2. (Box 74)

The (6,5,d) feasible networks that have been identified (with 2≤d≤4) can be partitioned into 19 equivalence classes, only one of which has d=d*=2. Hence, all (6,5,2) feasible networks are equivalent to the class representative depicted in FIG. 16. (Box 75) Furthermore, searching over network configurations with m=6 by appending two switches in each of the possible C(6,2)^2 positions in turn to each of the 40 class representatives with m=4 yields no nondominated feasible networks with d=2. From EQUATION 7, all 6×6 feasible networks with m≥7 must have d 2m/N>2, and so it follows that the equivalence class with the representative depicted in FIG. 16 is the unique class of 6×6 nondominated feasible networks with d=d*=2.

Shown in FIG. 16 is a preferred embodiment 6×6 (6,5,2) feasible network (d=d*=2 and m=m*=5) (labeled 100 in FIG. 16).

A similar analysis is performed for N=8. Table III, shown in FIG. 17, presents characteristics of the equivalence classes of nondominated 8×8 networks with m≤4, where the notation is the same as used in Table II (FIG. 16).

TABLE III (FIG. 17)
Equivalence Classes of Nondominated 8 × 8 Networks

| m | number | representatives |
|---|--------|-----------------|
| 0 | 1 | { } |
| 1 | 1 | {(0,2)} |
| 2 | 4 | {(0,2),(0,1)}, {•,(0,4)}, {•,(1,4)}, {•,(4,6)} |
| 3 | 19 | — |
| 4 | 101 | — |

Shown in FIG. 17 is a preferred embodiment 8×8 (8,8,3) feasible network (d=d*=3 and m=m*=8) (labelled 200 in FIG. 17).

Searching over network configurations with m=7 by appending three switches in every possible configuration in turn to each of the 101 class representatives with m=4 yields no feasible networks. (Box 76) Hence m*≥8. In fact, m*=8, since the analogous procedure with four additional switches yields many feasible solutions, of which none have d=2 and 21,840 have d=3. (Box 76) The large number of solutions makes the determination of equivalence classes computationally challenging. Instead, feasible solutions are determined with m=9 switches by performing the analogous procedure with five additional switches. Doing so yields no feasible solutions with d=2. From EQUATION 7, all 8×8 feasible networks with m≥10 have d 2m/N>2, and so it is concluded that d*=3. Hence, the network of FIG. 17 is one of many potentially nonequivalent) 8×8 feasible networks with m=m*=8 and d=d*=3. (Box 77)

Given the exponential growth in complexity, exhaustive search methods do not appear to be a promising approach to designing networks with N 10, though it is possible to determine networks with reasonable properties by searching over a suboptimally constrained space of configurations. For example, consider a 10×10 network design with m=12 switches and fix the configuration of third through tenth switches to that of FIG. 17. Considering all configurations for the remaining four switches results in 16 feasible networks with d=3, such as that depicted in FIG. 19.

Shown in FIG. 19 is a preferred embodiment 10×10 (10,12,3) feasible network (d=d*=3 and m=12) (labelled 300 in FIG. 19).

This (10,12,3) feasible network has parameters that seem to be reasonably commensurate with the growth of the corresponding parameters of the optimal networks with N≤8. In fact, from EQUATION 6, m*>9, and from EQUATION 8, d*≥2m*/N≥2. In fact, the proposed network is optimal in the loss metric, i.e., d=d*=3. This can be shown by eliminating the possibility of a (10,10,2) feasible network through exhaustive examinations of all such networks, since from EQUATION 7, m>10 ⇒ d>2. Additional programs that will take months to complete are conjectured to show that the depicted network is also optimal in the number of switches m, the proxy for the cost of the network.

As used herein the word "route" means a path of travel of an entangled photon through the optical fiber and switches from one of the plurality of inputs to one of the plurality of outputs.

As used herein, the terminology "subnetwork configuration" refers to a portion of the network configuration such as the optical fibers and switches by which a single photon travels from an input to an output.

As used herein the word "dominates" with respect to networks means one network dominates another network (or networks) comprising fewer switches if, after permutation of user labels, the second network can produce the same functionality without increasing signal loss to any user. Conversely, nondominated means the network is not dominated.

As used herein the word "equivalence" with respect to networks means two or more networks are deemed to be equivalent if the functionality and associated loss characteristics of the two or more networks are the same after some permutation of the user labels and network states.

As used herein the terminology in the title "METHOD AND SYSTEM OF NETWORK SWITCH OPTIMIZATION" means and/or includes "NETWORK SWITCH OPTIMIZATION SYSTEM AND METHOD AND OPTIMIZED NETWORK SWITCHES."

As used herein, the terminology ^ denotes that the text that follows is to be read as a superscript, such as to mean raised to the power of. As used herein, the terminology_denotes that the text that follows is to be read as a subscript.

As used herein, the terminology "photon source" means any system or plurality of systems with N output ports such that the output ports are paired and entangled photon pairs are emitted from each pair of output ports. The entangled pairs can be produced by any process, such as, but not limited to, spontaneous parametric down conversion in nonlinear media. Each photon of a single photon pair is to be emitted at approximately the same time. Two sets of entangled photon pairs emitted from the same pair of output ports are generally to be emitted with sufficient delay so that the two pairs of photons are distinguishable. This delay can be fixed or random, where the random delay might arise from, for example, random times of photon creation. In the case of a random delay, it is acceptable for the delay to be on occasion too short to allow different entangled photon pairs to be distinguished, with the understanding that this situation must be detected and appropriately handled (e.g., by rejecting the indistinguishable pair) by the network users or another network component. Independent of the timing of photon emissions on a pair of output ports that output entangled photons, no timing relationship is assumed to exist between the emissions of photons emitted at pairs of output ports not producing entangled pairs.

Obviously, many modifications and variations of the present invention are possible in light of the above teachings. It is therefore to be understood that, within the scope of the appended claims, the invention many be practiced otherwise than as specifically described.

The invention claimed is:

1. A method for determining a network configuration for delivery of entangled photons to a plurality of users such that any user of the plurality of users may share one of a pair of entangled photons with any other user; the network comprising a plurality of inputs; a plurality of switches, and a plurality of outputs operatively connected to the plurality of inputs by a plurality of optical fibers;

the plurality of switches, each having a first switch input and a second switch input and a first switch output and a second switch output and being switchable between two states, a first state in which the first switch input is connected to the first switch output and the second switch input is connected to the second switch output and a second state in which the first switch input is connected to the second switch output and the second switch input is connected to the first switch output; the method comprising:

determining the minimum number of switches necessary to deliver entangled photon pairs from a predetermined number of sources to a predetermined number of users, minimizing the loss experienced by an entangled photon passing through the plurality of switches by minimizing the number of switches that any one photon passes through by selecting only nondominated switch configurations;

determining the minimum number of equivalent network switch configurations and eliminating all but one of the equivalent network switch configurations; and selecting an optimum network configuration by which the plurality of inputs and the plurality of outputs are operatively interconnected so as to enable the delivery of one photon of the pair of entangled photons to each of the plurality of output ports using a minimum number of switches in any route connecting each of the plurality of outputs to the plurality of inputs.

2. The method of claim 1 wherein determining the minimum number switch configurations comprises:

determining all possible positions beginning with placement of a first switch, where the first switch connects with two of the plurality of input ports;

testing to determine whether one photon of a pair of entangled photons is delivered to each of the plurality of output ports and the corresponding signal loss;

determining first sets of equivalent switch positions; equivalent switch positions occurring when two or more switch positions deliver one of the same pair of entangled photons to one of the plurality of output ports with the same loss;

selecting one set of the determined first sets of equivalent switch positions and eliminating the other equivalent switch positions;

testing to determine whether one photon of a pair of entangled photons is delivered to each of the plurality of output ports; if the one photon of the pair of entangled photons is not delivered to each of the plurality of output ports with one switch, another switch is needed;

for each additional switch, determining all possible positions beginning with placement of an additional switch, where the additional switch connects with either two of the plurality of input ports or one or two switch output ports;

testing to determine whether one photon of a pair of entangled photons is delivered to each of the plurality of output ports and the corresponding signal loss;

determining second sets of equivalent switch positions; a switch position being equivalent to the representative switch position when the equivalent switch position delivers one of the same pair of entangled photons to one of the plurality of output ports;

selecting one set of the determined second sets of equivalent switch positions and eliminating the other equivalent switch positions;

testing to determine whether one photon of a pair of entangled photons is delivered to each of the plurality of output ports; if the one photon of the pair of entangled photons is not delivered to each of the plurality of output ports with one switch, another switch is needed; otherwise the network configuration is complete.

3. The method of claim 1 wherein the selecting only nondominated switch configurations comprises:
   determining whether a first network configuration is dominated by a second network configuration comprising fewer switches wherein the second network can produce the same functionality as the first network without increasing signal loss at any of the plurality of outputs.

4. The method of claim 3 wherein the signal loss is produced by a photon passing through a switch, and wherein determining whether the first network configuration dominates the second network configuration is achieved by determining the maximum number of switches that any one photon passes through in any one route of travel by that photon and selecting the network configuration that has the lowest number switches for the photon that passes through the most switches.

5. The method of claim 1 wherein the total number of switches that any one photon passes through is minimized by selecting only nondominated switch configurations; the network configuration being configured such that the maximum loss to any one user is reduced by determining which photon passes through the greatest number switches and minimizing that number.

6. The method of claim 1 wherein the number of users is eight and the number of input ports is eight and the network is configured such that any of the eight users may access one photon of an entangled photon pair with anyone of the other seven users of the network by switching between the two states for the plurality of switches as needed for the one user and the other user to access the individual photons of the entangled photon pair.

7. The method of claim 1 wherein the number of users is ten and the number of input ports is ten and the network is configured such that any of the ten users may access one photon of an entangled photon pair with anyone of the other nine users of the network by switching between the two states for the plurality of switches as needed for the one user and the other user to access the individual photons of the entangled photon pair.

8. A method for determining a network configuration for delivery of entangled photons to a plurality of users such that any user of the plurality of users may share one of a pair of entangled photons with any other user; the network comprising a plurality of inputs; a plurality of switches, and a plurality of outputs operatively connected to the plurality of inputs by a plurality of optical fibers;
   the plurality of switches, each having at least a first switch and a second switch input and a corresponding output for each input; and the plurality of switches being switchable between a plurality of states including a first state in which the first switch input is connected to the first switch output and the second switch input is connected to the second switch output and a second state in which the first switch input is connected to the second switch output and the second switch input is connected to the first switch output; the method comprising:
   determining the minimum number of switches necessary to deliver entangled photon pairs from a predetermined number of sources to a predetermined number of users,
   minimizing the loss experienced by any one entangled photon passing through the plurality of switches by determining the number of switches passed through by any one photon and minimizing that number of switches by selecting a switch configuration that minimizes the total number of switches that any one entangled photon passes through; and
   selecting an optimum network configuration by which the plurality of inputs and the plurality of outputs are operatively interconnected so as to enable the delivery of one of a pair of entangled photons to each of the plurality of output ports using a minimum number of switches in any route connecting each of the plurality of outputs to the plurality of inputs.

9. The method of claim 8 further comprising determining the minimum number of equivalent network switch configurations and eliminating all but one of the equivalent network switch configurations and wherein the number of switch inputs is 2 and the number of switch outputs is 2.

10. The method of claim 8 wherein the number of users is six and the number of input ports is six and the network is configured such that any of the six users may access one photon of an entangled photon pair with anyone of the other five users of the network by switching between the two states for the plurality of switches as needed for the one user and the other user to access the individual photons of the entangled photon pair.

11. The method of claim 8 wherein the number of users is eight and the number of input ports is eight and the network is configured such that any of the eight users may access one photon of an entangled photon pair with anyone of the other seven users of the network by switching between the two states for the plurality of switches as needed for the one user and the other user to access the individual photons of the entangled photon pair.

12. The method of claim 8 wherein the number of users is ten and the number of input ports is ten and the network is configured such that any of the ten users may access one photon of an entangled photon pair with anyone of the other nine users of the network by switching between the two states for the plurality of switches as needed for the one user and the other user to access the individual photons of the entangled photon pair.

13. An optimal network configuration for delivery of entangled photons to a plurality of users at corresponding outputs such that any one user may share one of a pair of entangled photons with any other user of the plurality of users; the network comprising a plurality of inputs; a plurality of switches, and a plurality of outputs operatively connected to the plurality of inputs by a plurality of optical fibers and the plurality of switches;
   each of the plurality of switches having a first switch input and a second switch input and a first switch output and a second switch output and being switchable between two states, a first state in which the first switch input is connected to the first switch output and the second switch input is connected to the second switch output and a second state in which the first switch input is connected to the second switch output and the second switch input is connected to the first switch output;
   the number of switches necessary to deliver entangled photon pairs from six or more sources to six or more users being the minimum number so as to minimize the loss experienced by an entangled photon passing through the plurality of switches such that any one photon passes through only nondominated subnetwork configurations, and wherein the plurality of inputs are operatively connected to the plurality of outputs by a minimum number of switches so as to enable the delivery of one of a pair of entangled photons to each of the plurality of output ports using a minimum number of switches in any route connecting each of the plurality of outputs to the plurality of inputs.

14. The network of claim 13 wherein timing of the switching of the plurality of switches is such to enable each photon of each of the entangled photon pairs to be received simultaneously by a pair of users.

15. The network of claim 13 further comprising a source of entangled photons in which one photon of each pair is routed though one of the plurality of inputs such that for a predetermined number of users at a given point in time there are N/2 entangled photon pairs being produced, N input ports which input a single photon of the pairs of entangled photons and N users.

16. The network of claim 13 wherein the minimum number of switches is determined by counting the number of switches passed through by each photon and determining a pathway of the photon that passes through the most switches and determining the network configuration that minimizes the number of switches for the photon that passes through the most switches.

17. The network of claim 13 wherein the network configuration is considered to be optimal when for each sub-network configuration that enables one of the plurality of photons to travel from an input port to an output port the maximum number of switches is reduced so that each photon is subjected to the least amount of loss through the least number of switches.

18. The network of claim 13 wherein the network configuration is configured such that the loss to any one user is reduced by determining which photon passes through the greatest number switches and minimizing that number.

19. The network of claim 13 wherein the number of users is eight and the number of input ports is eight and the network is configured such that any of the eight users may access one photon of an entangled photon pair with anyone of the other seven users of the network by switching between the two states for the plurality of switches as needed for the one user and the other user to access the individual photons of the entangled photon pair.

20. The network of claim 13 wherein the number of users is ten and the number of input ports is ten and the network is configured such that any of the ten users may access one photon of an entangled photon pair with anyone of the other nine users of the network by switching between the two states for the plurality of switches as needed for the one user and the other user to access the individual photons of the entangled photon pair.

\* \* \* \* \*